Nov. 17, 1931.  R. P. CAMPBELL  1,832,094
HARVESTING MACHINE
Filed April 9, 1928  4 Sheets-Sheet 1

INVENTOR.
Robert P. Campbell
BY
ATTORNEYS.

Nov. 17, 1931.    R. P. CAMPBELL    1,832,094
HARVESTING MACHINE
Filed April 9, 1928    4 Sheets-Sheet 2

INVENTOR.
Robert P. Campbell
BY
ATTORNEYS.

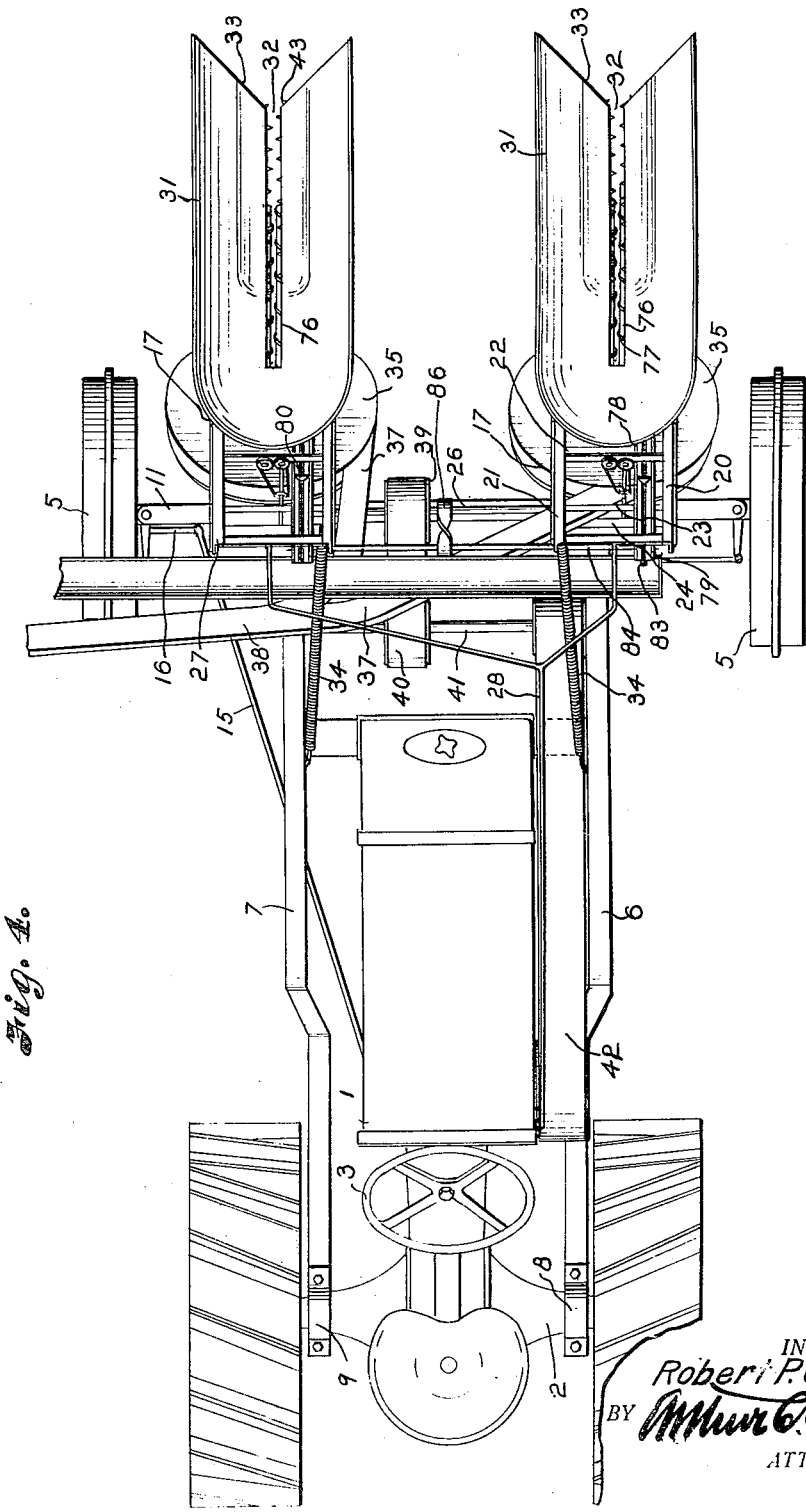

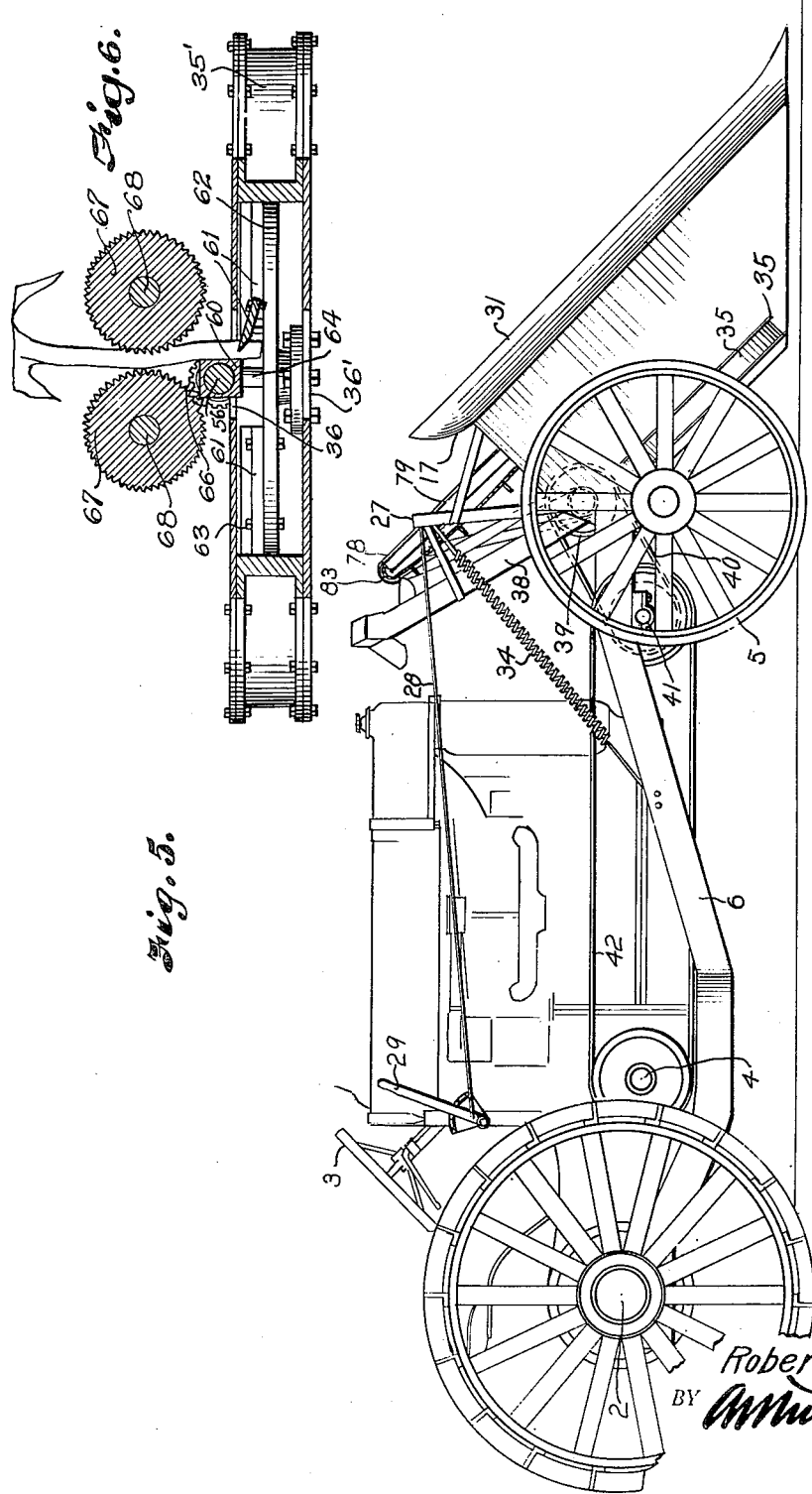

Patented Nov. 17, 1931

1,832,094

UNITED STATES PATENT OFFICE

ROBERT P. CAMPBELL, OF RACINE, WISCONSIN

HARVESTING MACHINE

Application filed April 9, 1928. Serial No. 268,532.

My invention relates to harvesting machines and particularly to machines for disposing of rowed crops, the principal objects of the invention being to cut up the stalks of a crop during the process of harvesting, to combine stalk-chopping mechanism with other mechanism of harvesting equipment, to provide self-cleaning stalk-cutting elements, and to assure the effective comminution of harvested stalks.

Further objects of the invention include the disposal of elements of the crop and means for attaching harvesting equipment to a tractor and operation thereof therefrom.

In accomplishing these and other objects of the invention I have provided improved details of structure, the preferred forms of which are illustrated in the accompanying drawings, wherein:

Fig. 4 is a plan view of a tractor to which the improved harvesting elements are attached.

Fig. 5 is a side elevation of a tractor equipped with my invention.

Fig. 6 is a section on the line 6—6, Fig. 2.

Figure 1:
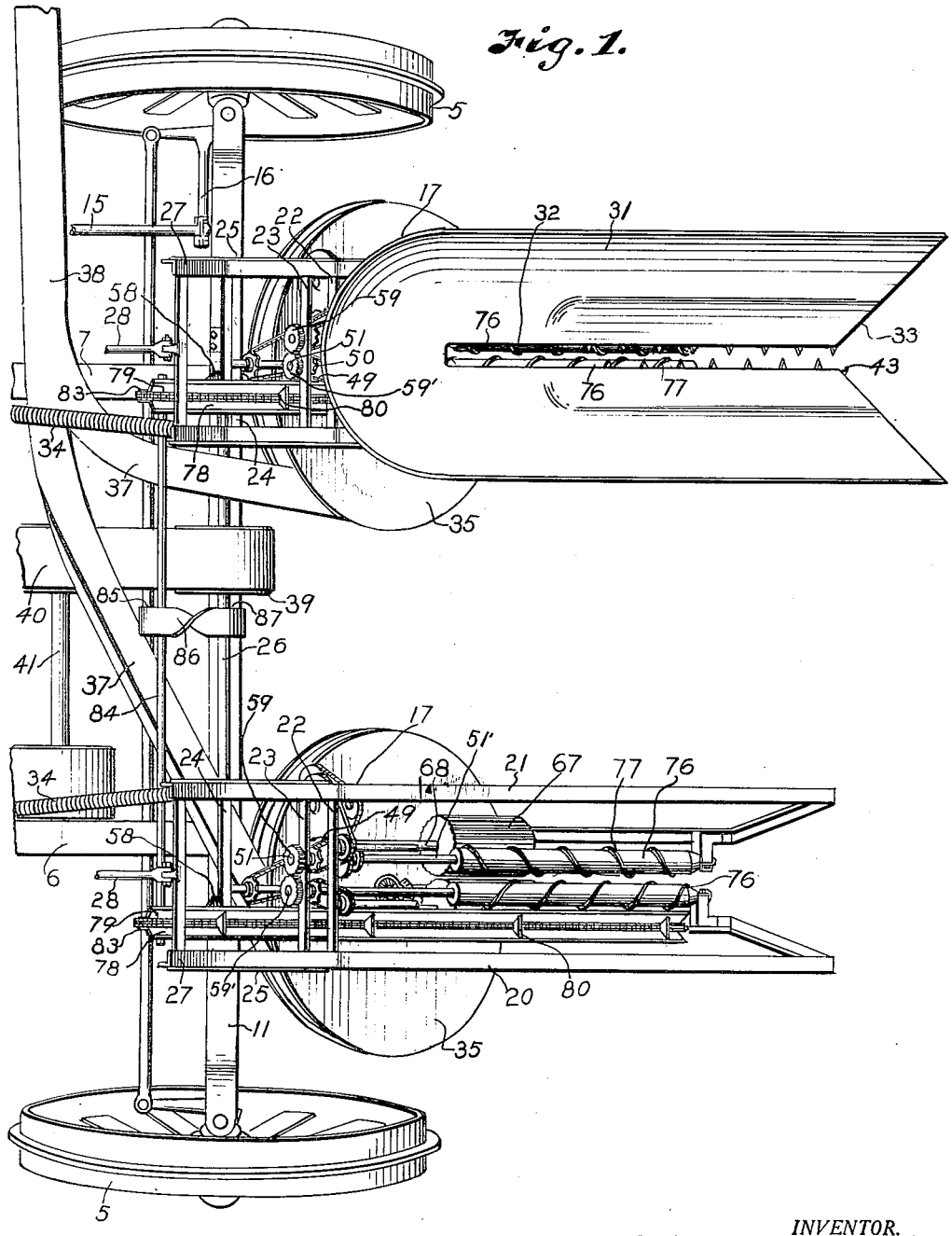
Fig. 1 is a perspective view from above of harvesting equipment embodying my invention, one of two similar elements being shown with guard plate removed.
Figure 2:
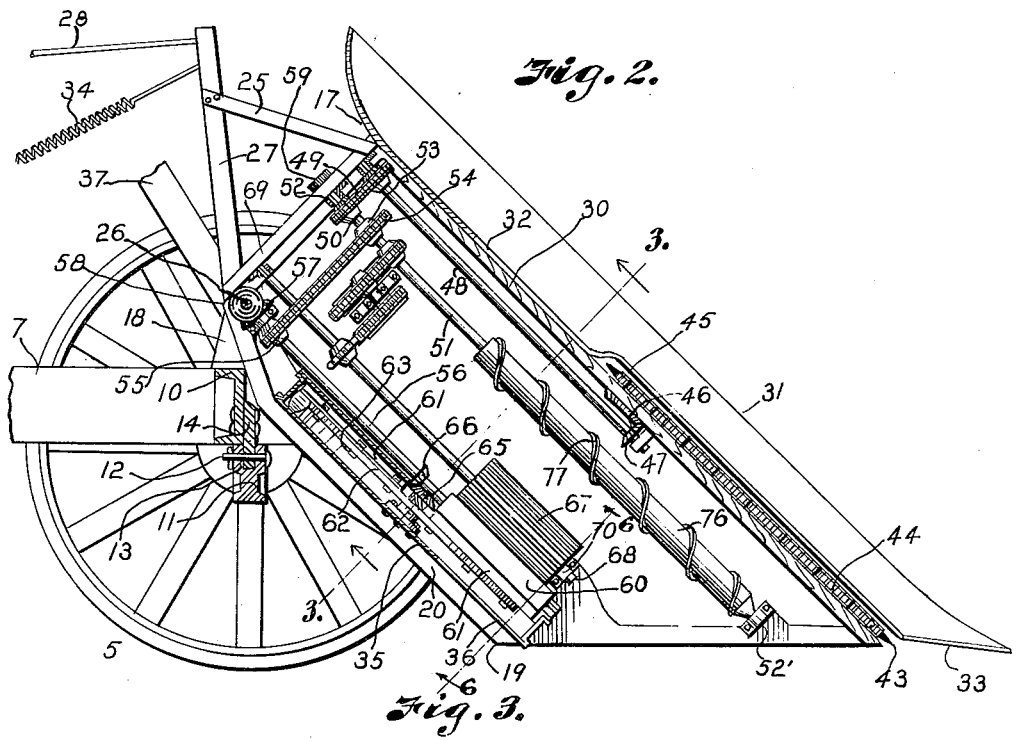
Fig. 2 is a longitudinal sectional view of one of the harvesting elements.
Figure 3:
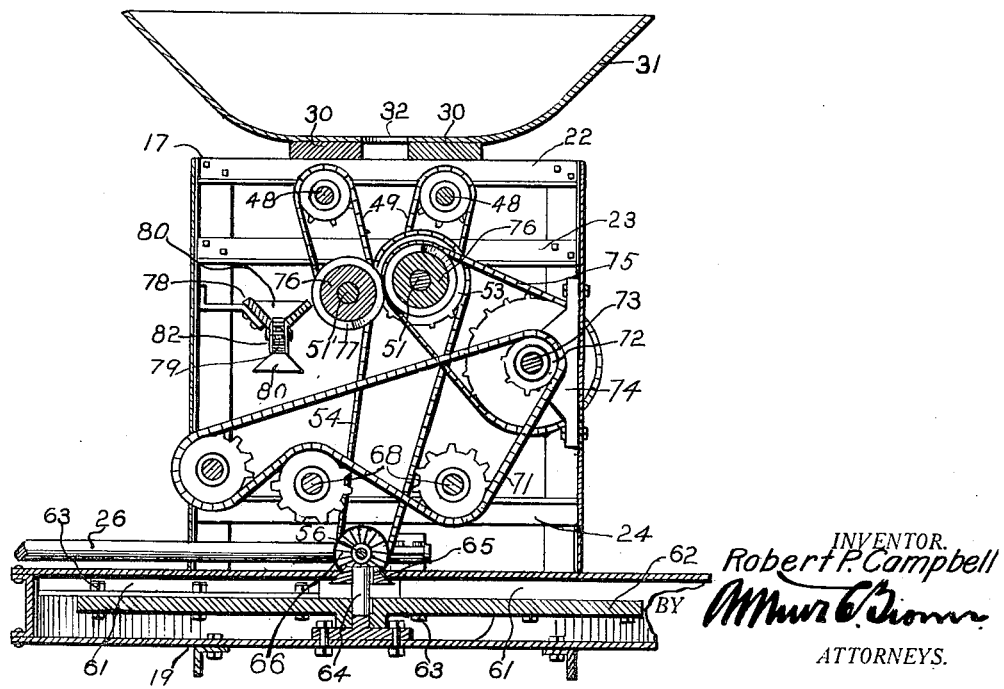
Fig. 3 is a transverse vertical section on the line 3—3, Fig. 2.

Referring in detail to the drawings:

1 designates generally a tractor including a rear axle 2, steering gear 3 and a power shaft 4. The tractor may be of any type and for illustrative purposes I show a particular type. The front wheels 5 of the tractor, in the illustrated application of the invention, are removed from the front axle, and frame members 6 and 7 are installed on opposite sides of the tractor having rear ends 8 and 9 rigidly connected with the rear axle, a cross member 10 connecting the front ends of the members 6 and 7. A special axle 11 longer than the usual front axle of the tractor is pivotally connected to the frame and the wheels are mounted thereon, the pivotal connection including a pivot pin such as 12 extending through ears 13 on the special axle and through a plate 14 attached to the cross member. A special steering rod 15 extends from steering knuckles 16 to the steering wheel. The arrangement provides for the pivotal support of my device, presently described, forwardly of the tractor.

Two similar harvesting element frames 17 suitably laterally spaced for positioning the harvesting members in relation to adjacent rows of a rowed crop, comprise vertical bearing-supporting members 18 secured to the frame members 6 and 7 and an angle iron structure generally designated 19 comprising parallel side members 20 and 21, cross members 22, 23 and 24, and brace members, such as 25, together with suitable connections for supporting operating elements.

The frames 19 are pivotally supported on a drive shaft 26 rotatable in bearings in the members 18. Vertical frame members 27 attached to the frames 19 are connected by a tie rod 28 for operation coincidentally from a lever 29 positioned adjacent the steering wheel and pivoted in the tractor frame for suitably tilting the pivoted frames 19.

Mounted on preferably wooden strips 30 attached to the frames 19 are guide members 31 having slots 32 extending substantially their length and terminating in flaring mouths 33, the frames 19 being normally inclined so that the mouths of the guide members move adjacent the ground to receive stalks of rowed crops and guide the same into the slots for operation thereon by mechanism presently described.

The frames 19, supporting the guide members, are pivoted on their supports and on the axis of the shaft 26, and are adjusted by the lever mentioned for facilitating the raising of their lower ends, by springs 34 fastened to the frames and fixed to the frame members 6 and 7 of the supporting structure.

Secured to the frame structure 19 of each guide element is a rearwardly upwardly inclined circular housing 35 including a slotted side wall 35', an upper wall having a slot 36 on a diameter thereof, and a lower wall having a slot 36' forming a forwardly presented notch or recess, said slots being aligned with the slot of the guide member. From these housings 35 extend conduits 37 which unite into a discharge conduit 38, for carrying away from the housings the material delivered thereto from the guides and conditioned by mechanism contained by the frames 19 and housings 35, presently described.

The mechanisms mentioned are actuated through a transverse shaft 26 having a pulley 39 moved by a belt 40 from a counter shaft 41 which, in turn, is rotated by a belt 42 moved by the power shaft 4 of the tractor. Since the harvesting elements are similar and are similarly actuated, one will be described, the same numbers being applied to like parts in the two elements, it being understood that each of the guide elements moves along one of adjacent rows of a rowed crop.

Positioned beneath the guide plate and movable along the opposite edges of the slot 32 are series of teeth 43 attached to spaced chains 44, the upper ends of the chains being supported on pintles 45 keyed in beveled gears 46 moved by beveled gears 47 on the lower ends of the shafts 48 supported in bearings carried by the wooden members 30 of the frame on each side of the slot, the shafts being oppositely rotated through chains 49 moving over sprockets 50 on two shafts 51 and 51′ extending longitudinally through the frame and supported by bearings, such as 52 and 52′ at opposite ends thereof and spaced on each side of the slot, the shafts being adapted for other purposes later described.

The shaft 51 has a sprocket 53 carrying a chain 54 that runs over a sprocket 55 on a shaft 56, said shaft 56 having a pinion 57 engaged with a gear 58 on the end of the drive shaft 26 and the shaft 51 having a spur gear 59 engaged with a similar spur gear 59′ on the shaft 51′ whereby the latter is rotated from the former, the shaft 56 being likewise supported by members of the frame 19 and having other functions later described.

The lower end of the shaft 56 comprises an elongated cutter bar or die member 60 located above the housing at one side of said slot 36 and rotating with the shaft 56. The bar is preferably square in cross section to provide four longitudinal blade-receiving edges movable into and out of the slot 36 and adapted to engage successively, as the shaft 56 is rotated, with the edges of upstanding radial blades 61, shown as four in number, and mounted on a rotating disk 62 concentrically supported within the housing 35. The blades are fixed to the disk by bolts 63 and incline upwardly in the direction of rotation of the disk, and have cutting edges operating adjacent the upper wall of the housing. The outer ends of the bar and blades thus operate at the front ends of the slots 36 and 36′ to cut standing stalks recessed in the edge notch of the housing. The disk is keyed to a stub shaft 64 rotatably supported by the housing and provided with a beveled gear 65 that projects slightly from the upper wall of the housing 35 into engagement with a beveled gear 66 carried by the shaft 56, so that the die member 60 and disk 62 are rotated by the same member coincidently. The blades may be positioned on the disk suitably for passing the edges of the cutting bar in shearing relation thereto to shear stalks from roots of standing grain.

Feeding rolls 67 supported on shafts 68 supported by bearings, such as 69 and 70, secured to the frame, are positioned to receive stalks admitted through the slot of the guide member and feed the same into the cutter housing, the shafts 68 being rotated through a chain 71 running over the sprocket 72 on a shaft 73 supported by bearings 74 from the frame, the shaft 73 being rotated through a chain 75 from the shaft 51 previously described as rotated from the sprockets moved by the main shaft 26.

I further preferably provide snapping rolls 76 comprising enlarged cylindrical portions of the shafts 51 and 51′, having oppositely winding spiral blades 77 spaced and positioned below the guide slot to permit passage of stalks and to grasp ears of grain carried by the stalks and remove the ears therefrom. A trough 78 is preferably provided adjacent one of the snapping rolls and supported by the elements of the frame 19 to receive ears so removed from stalks. An endless carrier chain 79 having regularly spaced cleats 80 moves in the trough to convey the ears upwardly and outwardly to suitable receivers, and travels over an idler sprocket 82 at the lower end of the trough 79, and over a driving sprocket 83 at the upper end. The driving sprockets 83 of the respective carrier chains are mounted on a single shaft 84 provided with a pulley 85 and driven by a belt 86 from a pulley 87 on the drive shaft 26.

In operating the apparatus above described, the paired and cooperatively actuated frames and carried apparatus including the cutting mechanism are lowered to suitable elevation of the guide members 31 and the tractor is moved longitudinally of the rows. The stalks received by the guide members are drawn and guided into the slots 32 by the chain-supported teeth.

The oppositely rotating snapping rolls are so spaced that the stalks may pass therebetween while the ears are torn from the stalks, the ears being discharged into the conveyor trough.

The fluted feeding rolls receive and hold the stalks while the blades and bar cut the same from the roots, and support them while also feeding them into the cutter housing, as presently described. A standing stalk in effect enters the slot 36 and notch 36′ alongside the cutter bar in a position to receive the slicing blows of the tips of the rotating blades. The first blow of the blade cuts a gash in the stalk, and as the machine advances, succeeding blades cut deeper gashes at higher positions on the stalk until a blade severs the stalk from the root. The inclined bar and blades cut angularly across the vertical stalks. The lower ends or root portions of the stalks are passed over by the radial blades and housing. The feed rolls will then feed the cut stalks rearwardly and downwardly to the housing through the slot 36 and the rotating disk causes the blades to press the stalks against the cutter bar 60 to cut slices from the lower ends of the cut stalks due to the inclined positions of the housing, bar, disk, and path of the blades, and also due to the downward feeding of the stalks through the slot 36 toward the disk and bottom wall of the housing by the feed rolls. Several cut stalks may thus be supported and fed by the rolls and be subjected simultaneously to slicing action of the blades. The provision of cutting angles or arris edges on the cutter bar adapted to cooperate with the blades results in a positive cutting or shearing action by the cooperating blade and cutter bar edge. Since there are preferably four edges on the square bar and four blades on the rotating disk, opportunity is afforded for the self-cleaning of the cutter bar, and the wearing of the bar edges is materially reduced.

Attention is called to the fact that the outer ends of the radial blades 61 extend beyond the periphery of the disk so that an area is provided for between the periphery of the disk housing and the periphery of the disk for the passage of a standing stalk into the path of the top portions of the blades.

The material thus cut in the housings is moved centrifugally therein by the rotating blades and these blades further set up air currents, the centrifugal motion and the air currents combining to discharge the cut material through the conduits 37 into the outlet 38.

What I claim and desire to secure by Letters Patent is:

1. In harvesting apparatus of the character described including a wheeled support, a guide member mounted on the support, and a housing on the support receiving material from the guide member, a blade carrier movable in the housing, blades secured to the carrier, and a cutter bar rotatably supported adjacent the path of the blades.

2. In harvesting apparatus of the character described including a wheeled frame a guide member mounted on the frame, and a housing on the frame receiving material from the guide member, a disk rotatable in the housing, blades radially secured to the disk, and a cutter bar rotatably supported adjacent the path of the blades.

3. In harvesting apparatus of the character described including a frame movable over the ground, and a slotted guide member connected to the frame, a slotted housing receiving material passing through the slot of the guide member, blades movable in the housing, and a cutter bar rotatably supported adjacent the path of the blades to cooperate therewith to cut said material.

4. In stalk-harvesting apparatus of the character described including a wheeled frame, and means for guiding stalks into position to be cut, a rotatable member having a plurality of radially disposed cutting members, a rotatable cutting bar having edges adapted for cooperation with the cutting edges of the rotatable member, and means for rotating the bar for shearing action of the cutting edges thereof with the edges of said rotatable member.

5. In harvesting apparatus of the character described including a frame movable over the ground, and means connected with the frame for guiding stalks rooted in the ground, a rotatable member having a plurality of radially disposed cutting members having upstanding edges, a rotatable cutting bar having edges adapted for cooperation with said cutting edges of the rotatable member, and means for rotating the bar for shearing action between the cutting edges thereof and the edges of said rotatable member.

6. In harvesting apparatus of the character described, in combination with a wheeled frame, a guide member, and husking rolls receiving material from the guide member, cutting means including feeder members engaging material being acted on by the husking rolls, a rotatable disk, blades secured to the disk, and a cutter bar rotatably supported adjacent the path of the blades, the feeder members being adapted to support husked material for cutting by said blades and cutter bar.

7. In a harvesting machine of the character described, a housing having a slot to receive a stalk of standing grain, means in said housing for cutting a received stalk from its root, and means for feeding the cut stalk to said cutting means to be chopped thereby.

8. In a harvesting machine of the character described means for guiding a standing stalk to be operated upon by the machine, a cutter adapted to cut the stalk from its root, and means receiving the stalk from said guiding means and adapted to feed the cut stalk to said cutter.

9. In a harvesting machine, a housing having a slot to receive a standing stalk of grain, cutting means in said housing for cutting the standing stalk from its root and adapted to chop the stalk, means for guiding the standing stalk into said slot, and means for receiving the cut stalk and feeding the same into engagement with said cutting means to be chopped thereby.

10. In a harvesting machine, a housing having a discharge mouth and a slot to receive a standing stalk of grain, cutting mechanism comprising a rotating and cutting member in the housing including a blade movable past said slot, a rotating bar at said slot having edges adapted to move in sliding relation with said blade to cut a received standing stalk from its root, and a feeder for receiving the stalk adapted to feed the same to said cutting mechanism for chopping the cut stalk.

11. In a harvesting machine, mechanism adapted to operate on standing stalks including an inclined housing having a slot adapted to receive a standing stalk and a discharge mouth for products of operation of the mechanism, means for guiding a standing stalk into said slot, a disk rotatable in the housing, blades fixed to one face of the disk and extending radially from points adjacent the center thereof to points beyond its periphery, a rotatable bar having cutting edges adapted to move in cutting relation with the blades on said rotatable disk, to cut said slot-receiving standing stalk from its root, means receiving the cut stalk and feeding the same into said housing, said blades and bar being adapted to chop the cut stalk fed thereto by said feeding means.

12. In a machine of the character described, a housing inclined upwardly rearwardly with reference to the direction of movement of the machine, means including a blade rotatable in the housing for severing a standing stalk from the root thereof, and means engageable with said standing stalk for feeding said stalk when severed into said severing means.

13. In a machine of the character described, an upwardly rearwardly inclined housing, a disk rotatively mounted in said housing, cutting means including a blade fixed to said disk having an end portion projecting beyond the periphery of the disk, and means for feeding stalks or the like into said housing to receive the cutting action of said blade.

14. In a machine of the character described, a housing including parallel slotted walls inclined upwardly and rearwardly with reference to the direction of movement of the machine, means for feeding substantially vertically positioned stalks downwardly into the housing, for movement from front to back of the housing through said slot in the upper wall thereof, and means for cutting stalks being fed to the housing.

15. In a machine of the character described, a circular housing including an upper wall having a diametrical slot and a lower wall having an edge incut to form a slot-like recess registering vertically with said upper wall slot to receive a stalk of standing grain, a disk rotative in the housing, a blade fixed to said disk having a cutting edge spaced from the disk and extending parallel to a diameter thereof and extending forwardly from the body of the blade in the direction of rotation of said disk, and having an end portion projecting beyond the periphery of the disk to move in a path adjacent the periphery of the housing for severing rooted stalks received by said slots, means for retaining stalks to receive the cutting action of the blade, and means engageable with one of said stalks for feeding the same through said upper wall slot into the housing after the stalk is cut from the root for receiving chopping action by said blade.

16. In a machine of the character described, a cutter housing including spaced substantially parallel walls having registering slots, a disk rotatable in the housing adjacent the one wall thereof, and a blade on said disk having a cutting edge moving in a path adjacent the other wall of the housing.

In testimony whereof I affix my signature.

ROBERT P. CAMPBELL.